July 13, 1965  A. L. STOECKEL  3,194,935
METHOD AND APPARATUS FOR MANUFACTURING HINGED
PANELS OF WIRE FABRIC
Filed Oct. 29, 1962  10 Sheets-Sheet 5
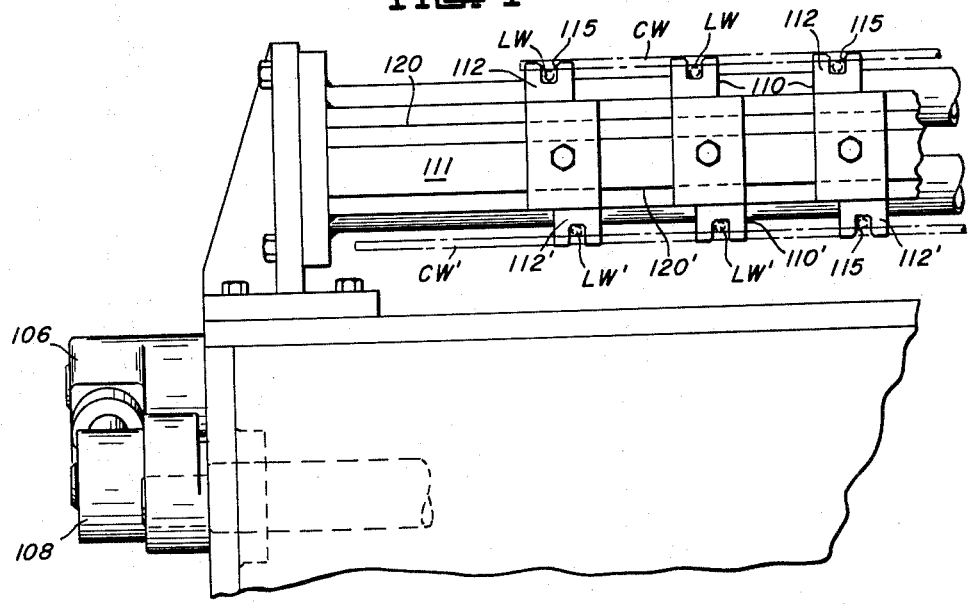
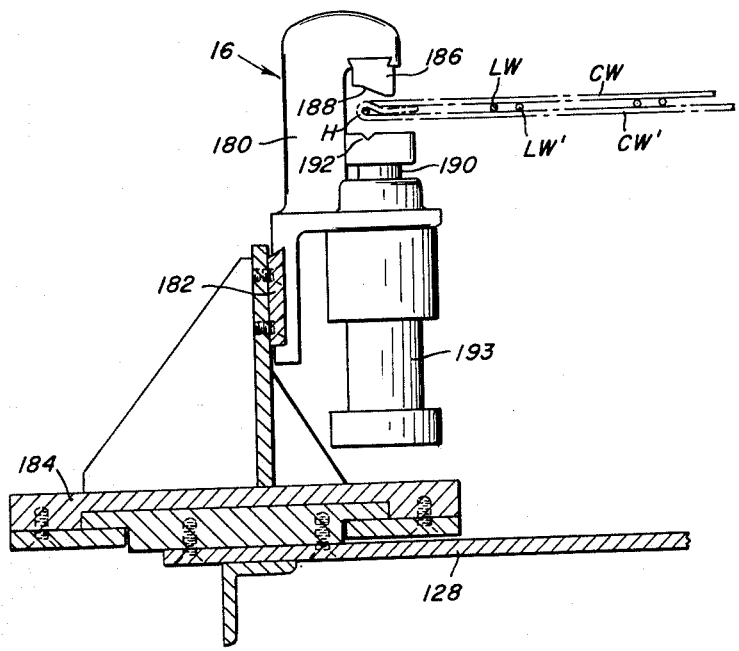
INVENTOR
ALBERT L. STOECKEL
By Donald H. Dalton
Attorney

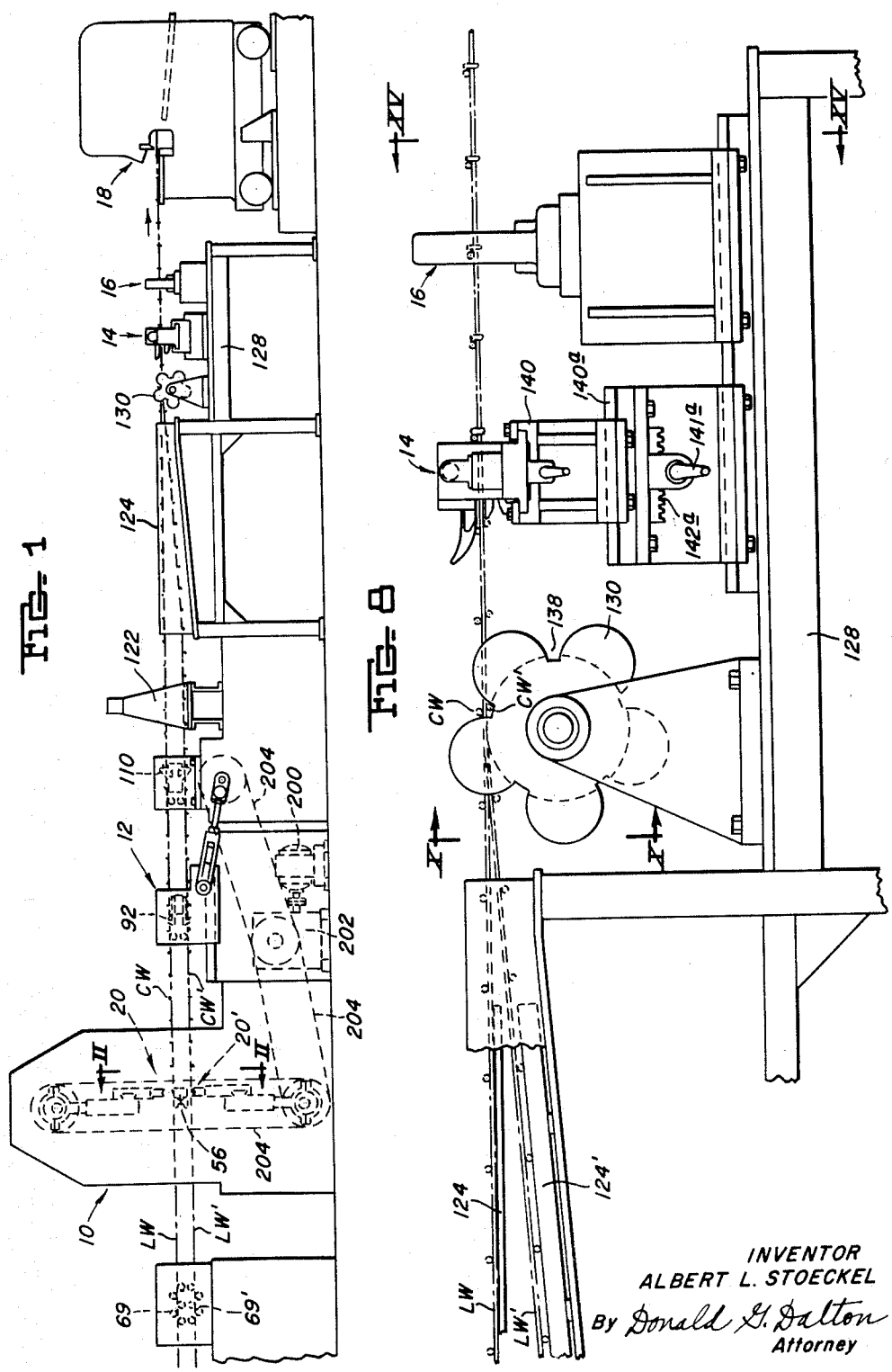

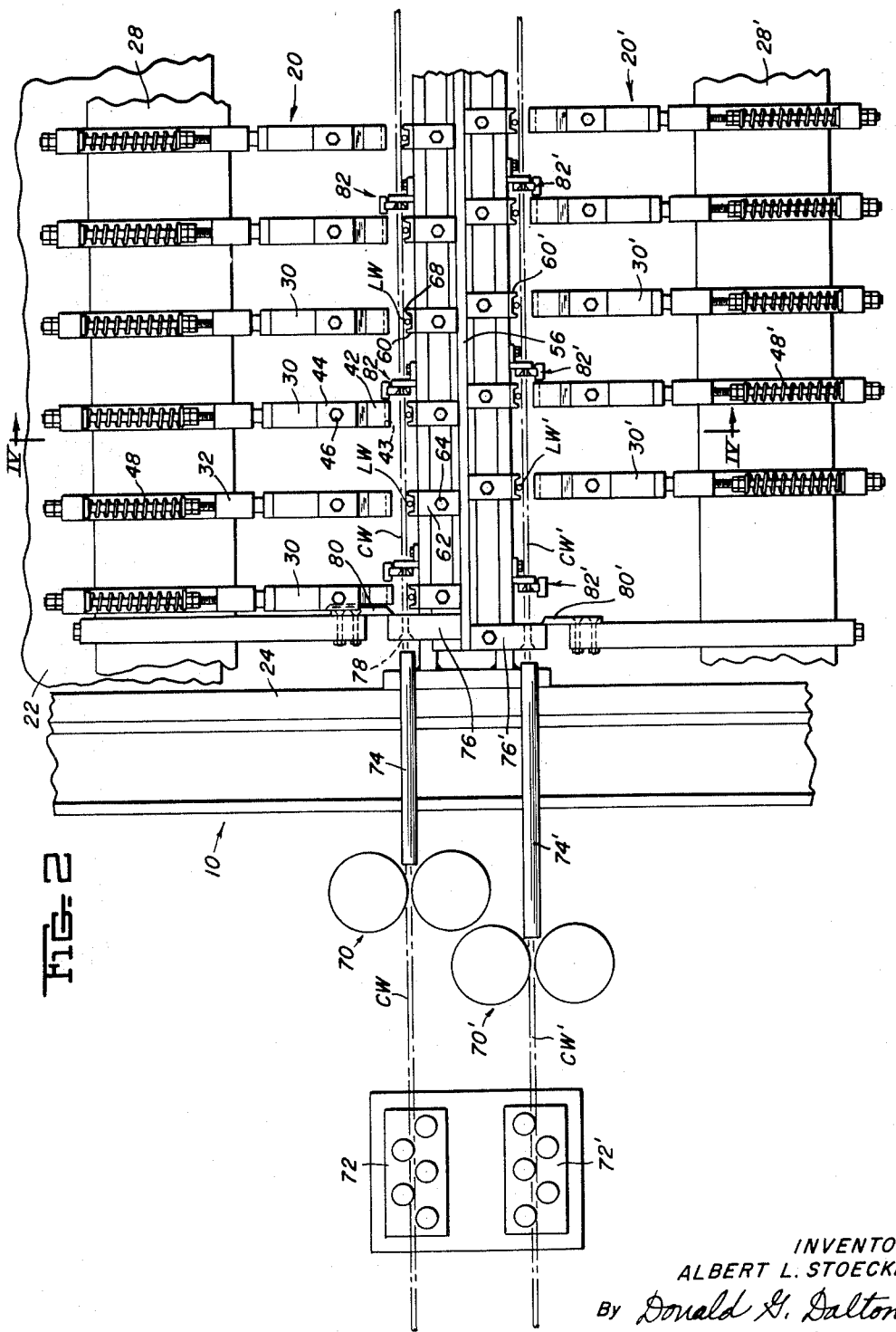

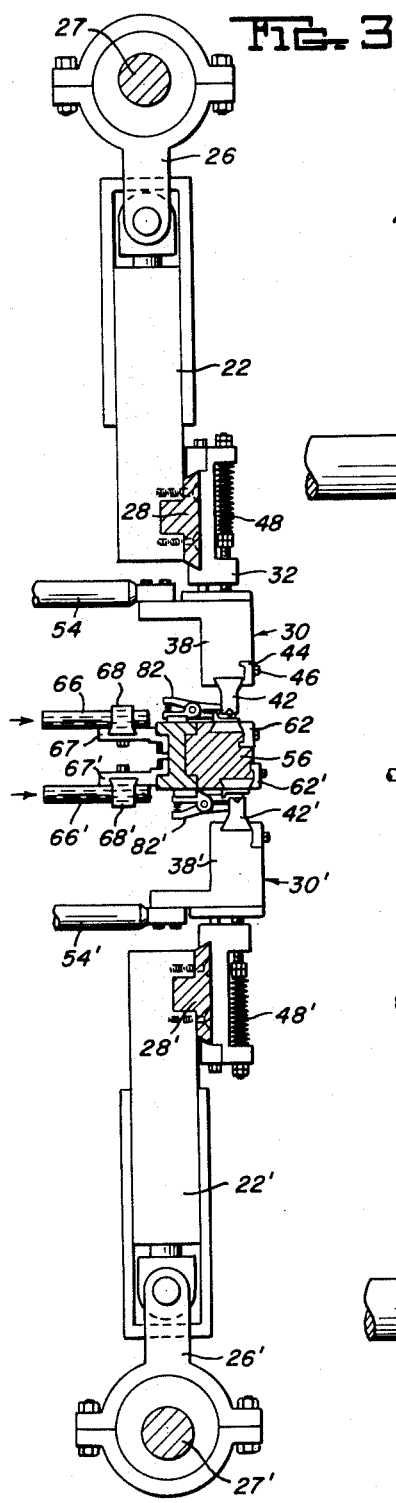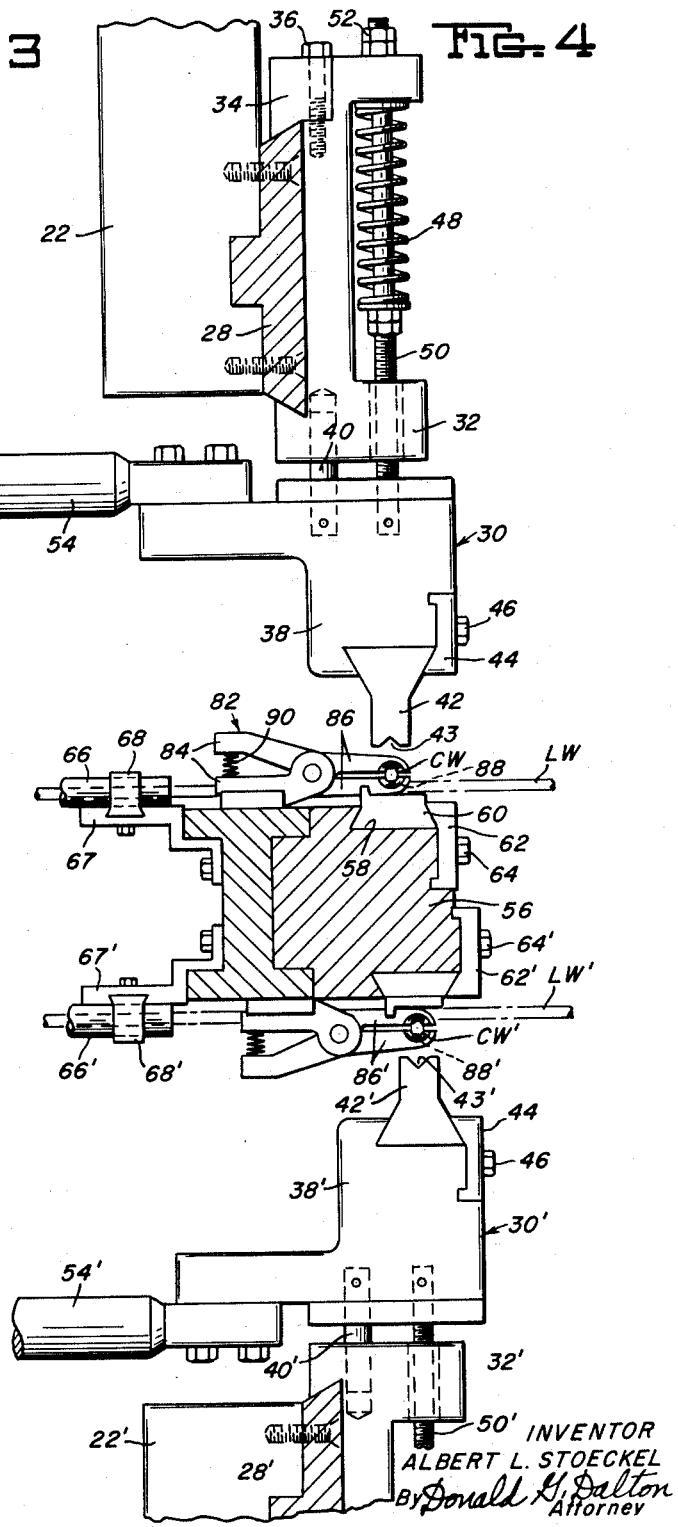

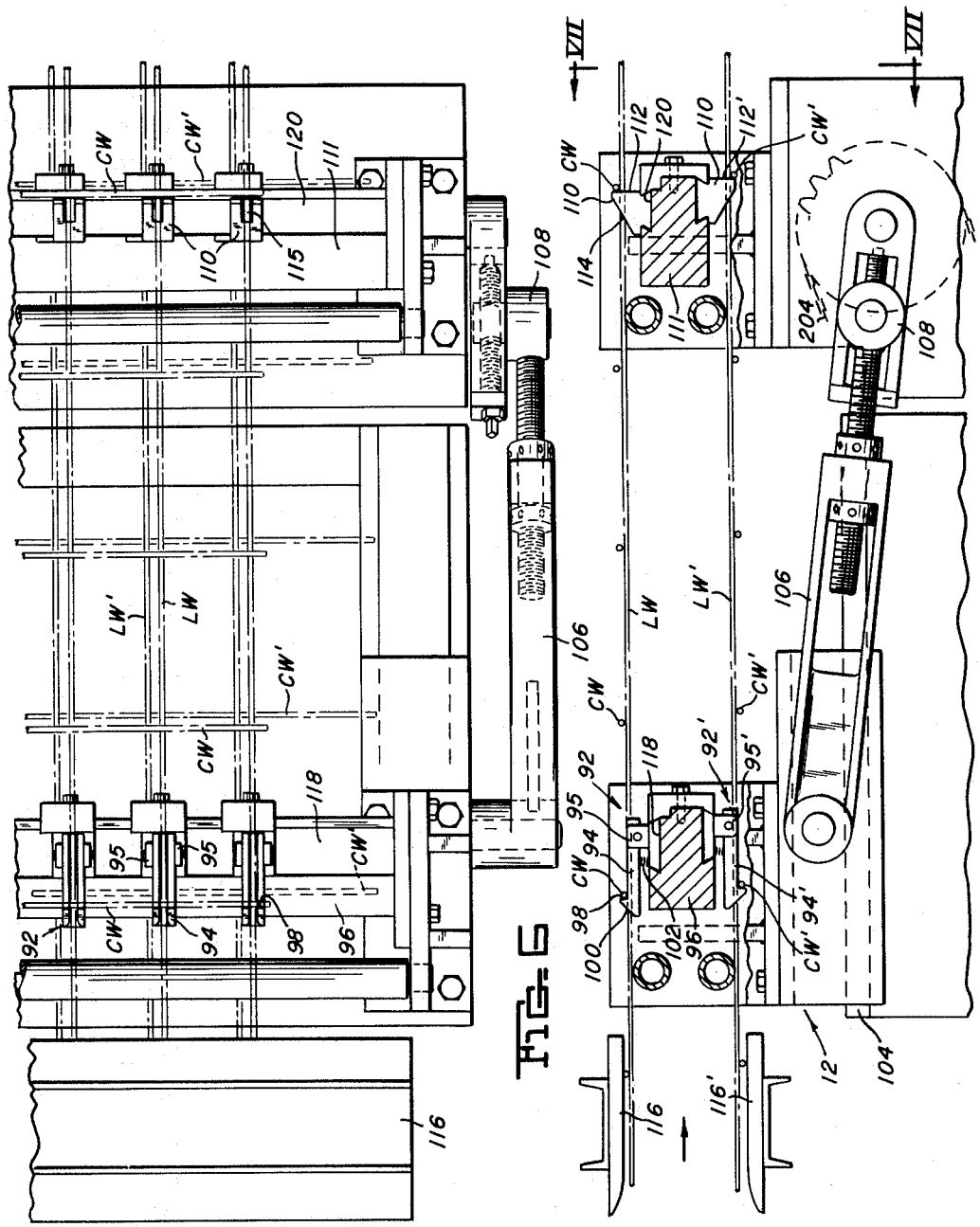

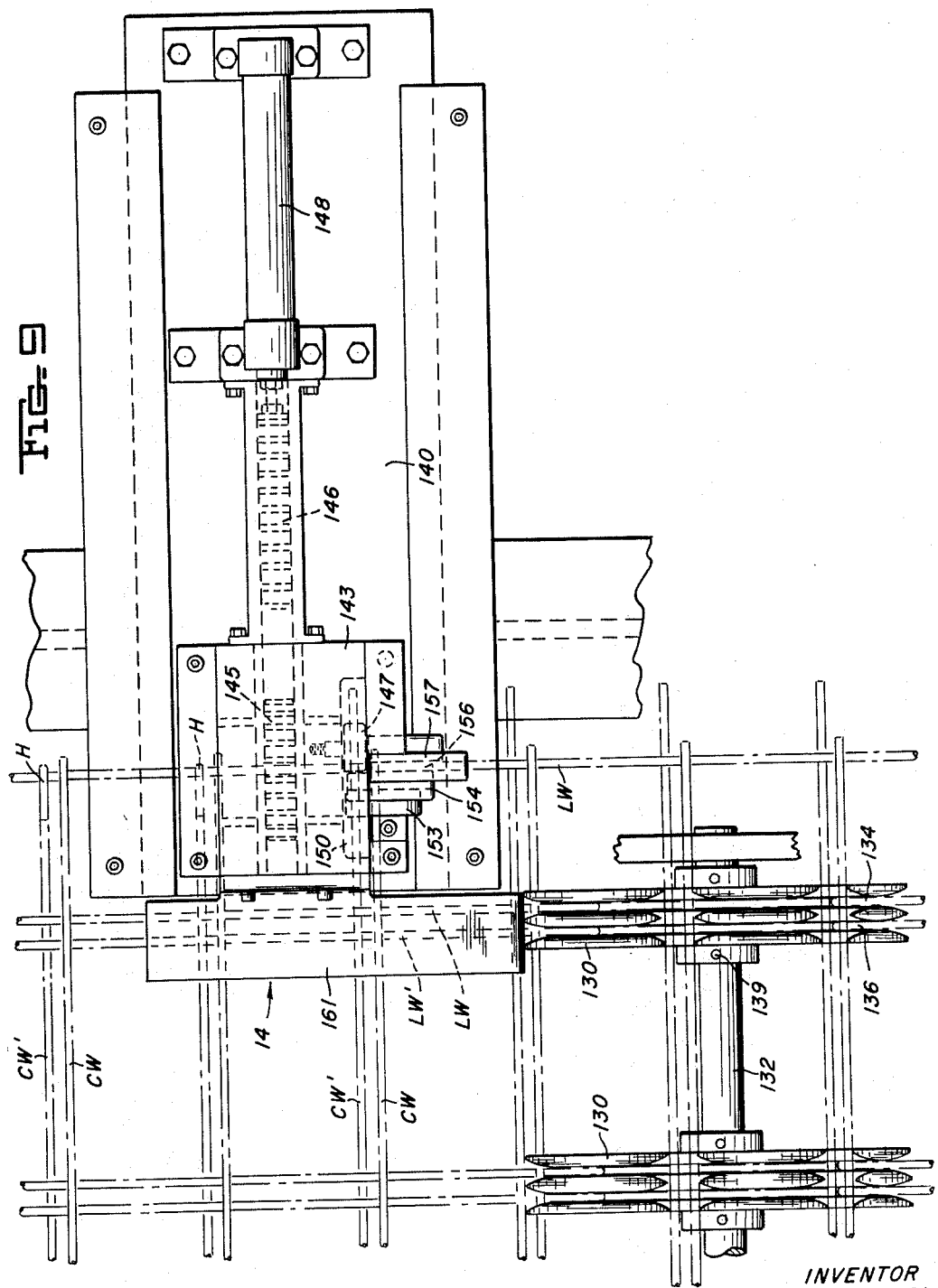

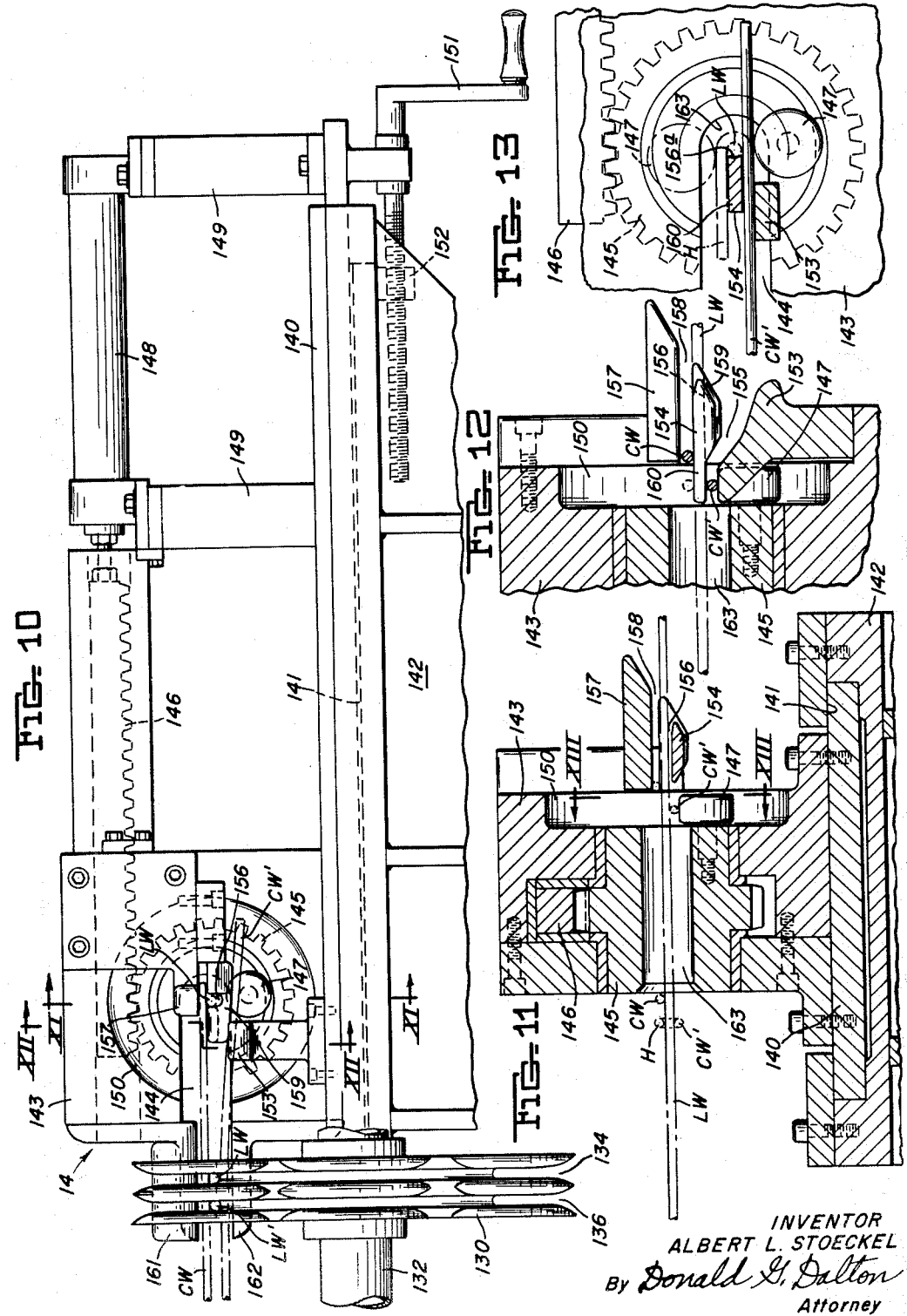

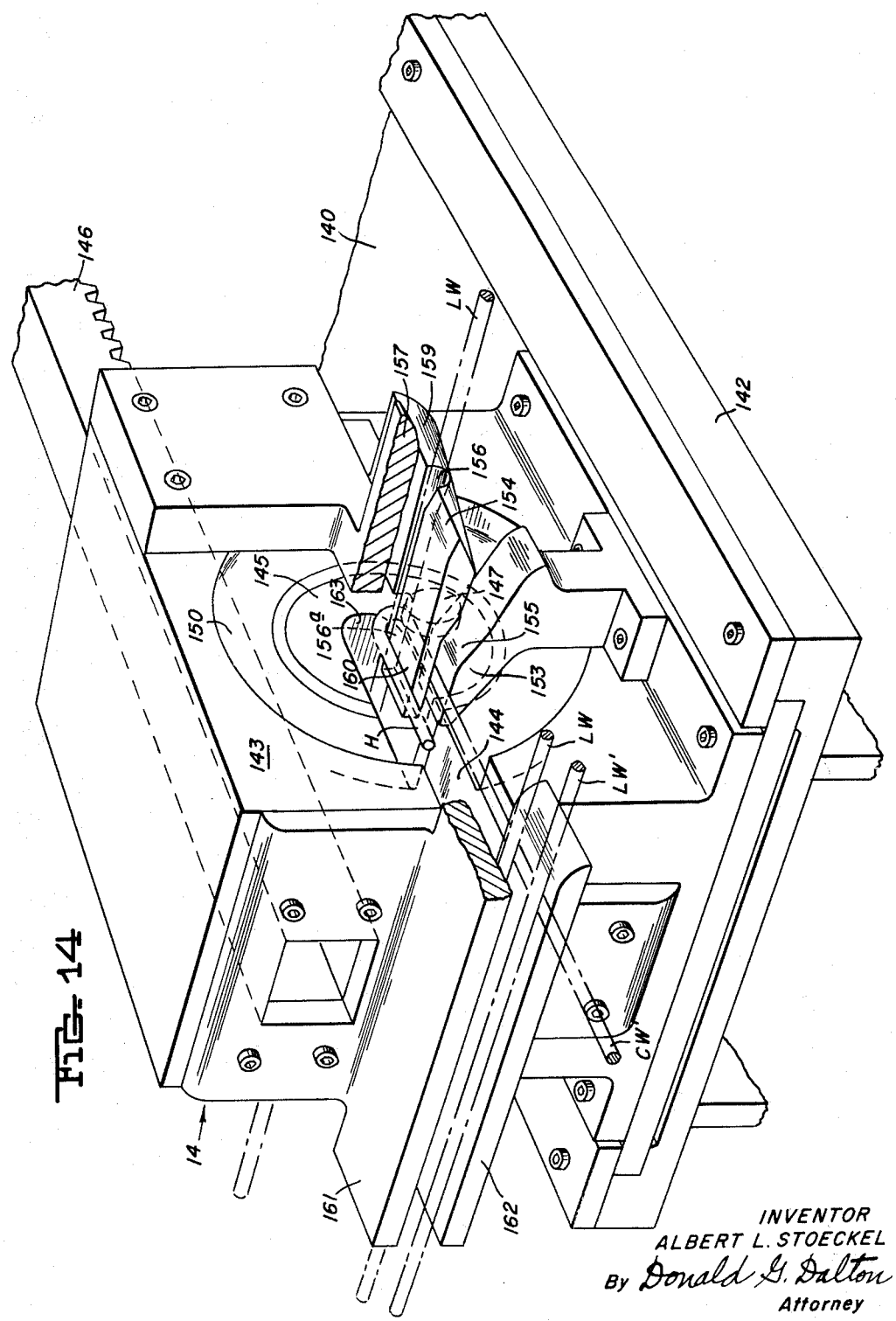

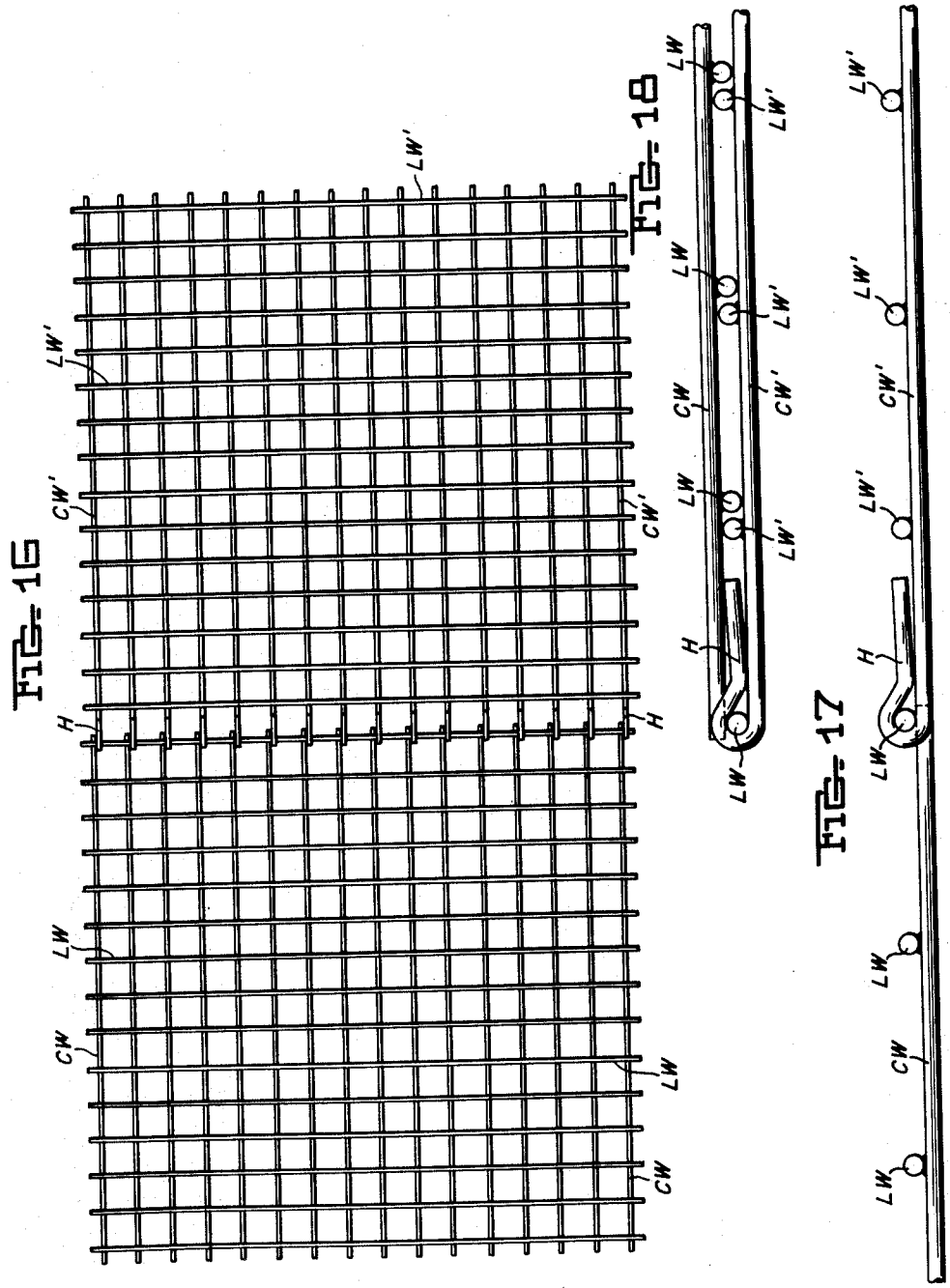

INVENTOR
ALBERT L. STOECKEL
By Donald G. Dalton
Attorney

United States Patent Office 3,194,935
Patented July 13, 1965

3,194,935
METHOD AND APPARATUS FOR MANUFACTURING HINGED PANELS OF WIRE FABRIC
Albert L. Stoeckel, Euclid, Ohio, assignor to United States Steel Corporation, a corporation of New Jersey
Filed Oct. 29, 1962, Ser. No. 233,687
13 Claims. (Cl. 219—56)

This invention relates to hinged two-piece welded wire fabric and, more particularly, to manufacturing such fabric in a folded condition.

Reinforcing wire fabric is produced at the factory and shipped to the location where it is to be used. The easiest and most economical way to ship this fabric is by laying it flat on the bed of a truck or railroad car. However, certain sizes of this fabric are too wide to be transported on trucks; for example, fabric for use in reinforcing modern concrete highways sometimes is up to 16 ft. wide, and such a width of fabric cannot be transported flat on trucks. To overcome such limitations, wire fabric has been formed of two hinged together sections which are folded one on top of the other for transportation, thus halfing the shipping width of the fabric. When the fabric is received at the job side, it is unfolded for use.

Heretofore it has been expensive to manufacture this folded fabric. Conventionally, the fabric has been formed in two side-by-side sections which were then hinged together. One section was then flipped onto the other section, thus forming a folded fabric suitable for shipping. This method of manufacturing a fabric requires wide equipment and complicated flipping and handling devices to automatically produce this fabric.

It is therefore a principal object of this invention to provide a simplified method and apparatus for manufacturing hinged wire fabric.

A more particular object of this invention is to provide a method and apparatus for forming wire fabric in a superposed condition to eliminate the necessity of flipping a section of fabric.

A further object of this invention is the production of fabric sections in a superposed condition and hinging the strips of wire fabric to form folded sections of the fabric.

Other objects and advantages of the invention will become apparent from the following description and accompanying drawings, in which:

FIGURE 1 is a side elevational view somewhat schematic of the hinged fabric forming apparatus of this invention;

FIGURE 2 is a partial sectional view on an enlarged scale from FIGURE 1 looking substantially in the direction of line II—II of FIGURE 1;

FIGURE 3 is a side elevational view partially in section with parts broken away of the welder of this invention;

FIGURE 4 is a view looking substantially in the direction of line IV—IV of FIGURE 2;

FIGURE 5 is a plan view of a portion of the fabric pulling mechanism of this invention;

FIGURE 6 is an elevational view partially in section with parts broken away of the fabric pulling mechanism of this invention;

FIGURE 7 is a view looking substantially along line VII—VII of FIGURE 6;

FIGURE 8 is a side elevational view on an enlarged scale from FIGURE 1 of the hinge forming and closing mechanism of this invention;

FIGURE 9 is a plan view of the hinge forming mechanism;

FIGURE 10 is a front elevational view of the hinge forming mechanism of this invention;

FIGURE 11 is a sectional view looking substantially in the direction of line XI—XI of FIGURE 10;

FIGURE 12 is a sectional view looking substantially in the direction of line XII—XII of FIGURE 10;

FIGURE 13 is a sectional view looking substantially in the direction of line XIII—XIII of FIGURE 11;

FIGURE 15 is a perspective view partially in section with parts broken away for clarity of the hinge forming mechanism;

FIGURE 15 is a front elevational view of the hinge closing mechanism of this invention;

FIGURE 16 is a plan view of an opened sheet of hinged fabric panel made according to this invention;

FIGURE 17 is an enlarged side elevational view of the opened fabric panel of FIGURE 16;

FIGURE 18 is a side elevational view of the hinged end of a fabric panel as it is produced according to this invention;

Figure 19:
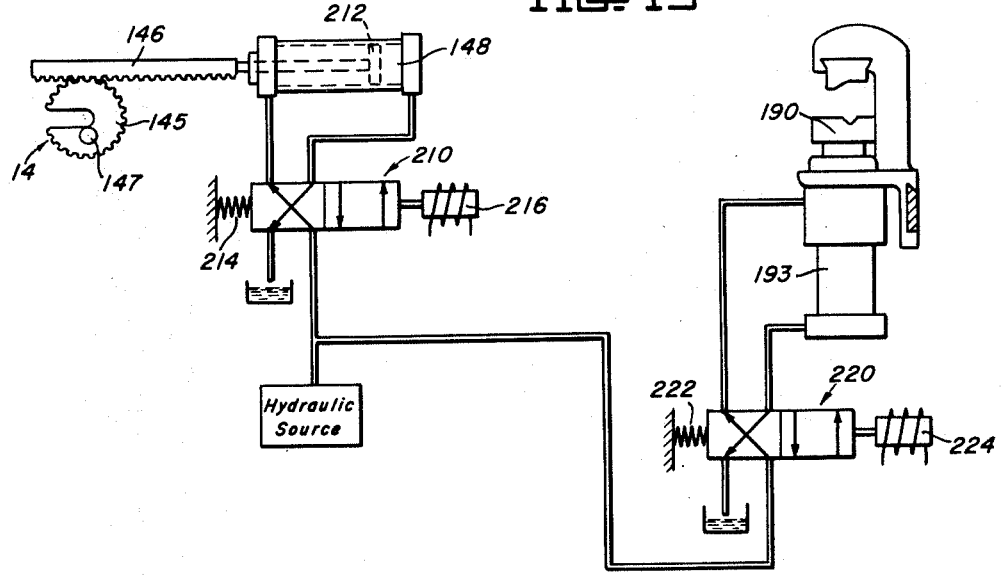
FIGURE 19 is a schematic view of the hydraulic actuating and drive circuit.

Referring now to the drawings and particularly to FIGURE 1, an apparatus for forming hinged panels of welded wire fabric is shown. The apparatus of FIGURE 1 will form the panels in the folded condition as shown in FIGURE 18. The apparatus includes a dual plane welder 10 adapted to simultaneously form upper and lower strips of welded wire fabric by welding cross wires to line wires. The line wires are advanced through the welder 10 by a fabric pulling mechanism 12 which delivers the upper and lower strips of welded fabric to a hinge-forming mechanism 14 where the strips are hingedly connected. From the hinge forming mechanism 14 the connected strips of fabric are moved to a hinge closing mechanism 16 where the formed hinges are clinched and thence to a shear 18 where the fabric is sheared to selected panel lengths.

*Welder*

Referring now to FIGURES 2, 3 and 4, the dual plane welder 10 is shown in detail and includes an upper welding mechanism designated generally as 20 and a lower welding mechanism designated generally as 20'. The upper welding mechanism 20 is adapted to weld lengths of cross wires CW to a plurality of line wires LW at selected intervals as the line wires are advanced through the welding mechanism 20. This forms an upper welded wire fabric strip coming from the welder 10. The lower welding mechanism 20' is similarly adapted to weld sections of cross wires CW' to line wires LW' to form a lower welded wire fabric strip. Since the upper and lower mechanisms each contain essentially the same components as approximate mirror images, the upper mechanism will be described in detail with the comparable components of the lower mechanism being designated by primed reference characters.

The upper welding mechanism 20 includes a support frame 22 which is mounted for vertical movement on a guide track shown schematically at 24 and is driven reciprocally on the track by eccentric arm 26 mounted on shaft 27. The support frame 22 has an elongated dove tail plate 28 which is adapted to mount a plurality of welding gun assemblies 30. Each of the gun assemblies 30 includes a mounting bracket 32 slidably engaging the dove tail plate 28 and is secured thereto by a clamp 34 and associated bolt 36. When the bolt 36 is loosened the bracket 32 can be slid along the plate 28 to position the gun assembly laterally on the frame 22. When the bolt 36 is tightened the gun assembly is held in its selected position.

Each gun assembly 30 includes an electrode 38 slidably mounted on a pin 40 extending downwardly from the bracket 32. The electrode 38 has a welding tip 42 detachably secured thereto by a clamp 44 and associated bolt 46. A V-shaped groove 43 is formed in the tip 42 for a purpose which will appear. The tip 42 is made detachable for facile replacement thereof. The electrode is urged away from the bracket 32 by a spring 48 carried by the bracket 32 urging against a rod 50 which in turn urges against electrode 38. The force against electrode 38 can be adjusted in a well known manner by nuts 52 threaded on rod 50. The reason for this type of mounting will be indicated presently. Welding power is supplied to the electrodes 38 in a conventional manner by electric cables 54 attached to a power source (not shown). The lower welding assembly 20' has similar welding gun assemblies 30' similarly mounted and powered.

Located between the upper and lower electrode gun assemblies 30 and 30' is an electrode support bar 56 which is a part of both the upper welding assembly 20 and the lower welding assembly 20'. The upper and lower portions of the bar 56 are similar, the upper portion being a part of the upper welding assembly 20 and the lower being a part of the lower welding assembly 20'. The bar 56 has an upper groove 58 in which are mounted a plurality of stationary welding electrodes 60. The electrodes 60 are held in the groove by clamps 62 and associated bolts 64 and are slidable along the bar when the clamps 62 are loosened to align with the welding gun assemblies 30. Each welding gun assembly 30 coacts with a stationary electrode 60 to weld cross wires CW to line wires LW.

The line wires LW are introduced into the assembly 20 through guide tubes 66 mounted on the support bar 56 by a bracket 67. The guide tubes 66 are positionable along the bracket 67 by means of dovetail clamps 68 for properly aligning each of the tubes 66 with a line wire LW. The line wires are fed to the guide tubes 66 and 66' from conventional spools (not shown) through straighteners 69 and 69'. (FIGURE 1.)

The cross wire CW is fed into the upper welding assembly 20 transversely to the line wires LW from a conventional spool (not shown). The wire CW is drawn from the spool by a pair of feed rolls 70 which pull the wire through a straightener 72 and feed it into a guide tube 74 and thence through a guide block 76 carried by the support bar 56. The guide block 76 has a flared passage 78 to receive and pass the cross wire CW. The cross wire CW is fed through the guide block 76 on top of the line wires LW and is passed across the upper assembly 20 until it has crossed all of the line wires LW at which point the feed rolls are stopped with the cross wire CW in position for welding to the line wires LW.

For welding, the upper frame 22 is lowered by the eccentric arm 26 bringing the welding tips 42 into contact with the cross wire CW thereby welding the cross wire CW to the line wire LW. The grooves 43 on welding tips 42 engage and hold the cross wire CW during welding. During the downward movement of the upper frame 22 the cross wire CW is sheared to the length by a shear blade 80 carried by the upper frame 22 and slidably engaging guide block 76. The lower cross wire CW' is similarly fed into the lower assembly 20' below the line wires LW' and is sheared and welded by eccentric arm 26' moving the lower frame 22' upwardly.

To aid in guiding the cross wire CW as it is moved across the line wires LW a plurality of guide clamps 82 are provided. Each guide clamp 82 has a pair of pivotally interconnected levers 84 one of which is slidably attached to the support bar 56. The levers 84 have mated guide ends 86 which together define a flared wire passage 88. The other ends of the levers 84 are biased apart by a spring 90 thus normally urging the guide ends 86 into a closed position. As can be best seen in FIGURE 4, the guide clamps 82 normally hold the cross wire in position to be welded, but upon a force urging the cross wire CW to the right as seen in FIGURE 4 the guide clamps 82 will spring open releasing the wire CW. The purpose for such construction will become apparent.

As can be seen in FIGURE 2, each welding gun assembly 30 and its associated stationary electrode 60 is laterally offset with respect to the corresponding gun assembly 30' and its associated stationary electrode 60'. Thus, the line wires LW are offset with respect to line wires LW' which will permit a nesting of the upper fabric with the lower fabric. Also, as can be seen in FIGURES 3 and 4, each welding gun assembly 30 and its associated stationary electrode 60 is longitudinally (with respect to the line wires) offset with respect to its corresponding gun assembly 30' and its associated stationary electrode 60'. The upper and lower fabrics as thus formed are positioned to have the cross wire CW' formed into hinges connected to the outer line wire LW as will become apparent presently.

The welding of cross wire CW to line wires LW is as follows: a plurality of line wires LW are led through the guide tubes 66 and through the grooves 68 in the electrodes 60. The cross wire CW is fed across the line wires LW and stopped in position. The eccentric arm 26 lowers the frame 22 shearing the cross wire CW and then upon continued movement the welding tips 42 come into contact with sheared section of cross wire CW. A welding circuit is formed by the electrodes 38 and 60 which welds the line wires LW to the cross wire CW. The springs 48 yield during the latter part of the downward motion of the frame 22 after the tips 42 contact cross wire CW which yielding maintains the welding tips 42 in contact with the cross wire CW to effect the welds. The eccentric arm 26 then moves the frame 22 upwardly and, after the springs 48 return to normal, contact in the welding circuit is broken. Thus, with one complete revolution of the eccentric a length of cross wire CW has been fed, sheared and welded to the line wires LW. The operation of the lower welding mechanism 20' is similar to that of the upper welding mechanism 20.

*Fabric pulling mechanism*

The fabric pulling mechainsm 12, shown in detail in FIGURES 5, 6 and 7 is located adjacent the welder 10 and is adapted to pull the fabric, as it is formed, from the wleder 10. The fabric pulling mechanism 12 includes an upper fabric puller 92 and a lower fabric puller 92'. Since the upper and lower pullers are virtually identical and approximate mirror images of each other, only the upper one will be described in detail, the corresponding parts on the lower mechanism being designated by primed reference characters. The uper puller 92 includes a set of puller fingers 94 pivotally mounted at 95 to the top of a support member 96. The support member 96 constitutes a part of both the upper fabric puller 92 and the lower fabric puller 92'. The puller fingers 94 each have a vertical surface 98 adapted to engage cross wire CW. The upper puller fingers 94 also each have a curved camming or override surface 100, the purpose of which will be described presently. Biasing springs 102 are interposed between the fingers 94 and the support member 96 and urge the fingers 94 upwardly about their pivotal mountings 95. The support member 96 is mounted for reciprocal movement on a guide track 104 and is movable thereon by means of an arm 106 operably connected to eccentric 108.

After the welder 10 has welded a cross wire CW to line wires LW and cross wire CW' to line wires LW', the arm 106 is actuated in a manner to be described to move the support member 96 from left to right as seen in FIGURE 6. This will cause the vertical surfaces 98 on the fingers 94 to engage cross wire CW and move the cross wire CW to the right. Since the cross wire CW has been welded to the line wires LW, this will move the whole upper fabric to the right as seen in FIGURE 6 which will also draw the line wires LW from the spools feeding them through the welder 10. This movement takes place after the eccentric 26 has moved the gun assembly 30 out of contact with the upper fabric. The force on the upper fabric will cause the cross wires CW which have just been welded at the welder to exert a force on the guide clamps 82 drawing the cross wire CW therefrom as described above. When the arm 106 has moved the support member 96 to its extreme right position as seen in FIGURE 6, the eccentric 108 will then return the support member 96 back to the position at the left. The camming surfaces 100 on the fingers 94 will cam over any cross wire encountered on their return movement and will be ready to engage another cross wire CW for the next movement to the right.

The fabric pulling mechanism 12 also includes a set of keepers 110 mounted on a block 111. Each keeper 110 has a vertical face 112 and an inclined camming face 114.

The keepers 110 each have a slot 115 adapted to pass the line wires LW. As the upper fabric is drawn to the right, as seen in FIGURE 6, cross wires CW will cam up over the camming faces 114 of the keepers 110 and then will be engaged by the vertical faces 112. Thus, fabric moved to the right by fingers 94 will be retained in this moved position by keepers 110 when the fingers are returned to engage the next cross wire CW and the line wires LW will be positioned for the welding of the next cross wire CW.

In order to maintain the fabric in contact with the fingers 94 entry guides 116 are provided between the welder 10 and the fabric pulling mechanism 12. These guides 116 insure that the fingers 94 will engage the cross wires CW to effectively move the fabric as it is being welded. Both the keepers 110 and the puller fingers 94 are mounted for lateral adjustment in dove tail grooves 118 and 120 respectively in support member 96 and block 111. Thus, the fingers 94 and keepers 110 can be adjusted to conform to the fabric emerging from the welder 10.

From the fabric pulling mechanism 12, the fabric is advanced to a conventional side-trim shear 122 which shears the cross wires CW and CW' to the exact length required. The cross wires CW' at the end to be formed into a hinge are trimmed to a longer length than the cross wires CW.

From the shear 122 the fabric is delivered over fabric guide bars 124 to the hinge forming mechanism 14. Both the hinge forming mechanism 14 and hinge closing mechanism 16 are mounted on a common support 128.

*Star Wheels*

The hinge forming mechanism 14 has positioned in front of it and mounted on support 128 a pair of star wheels 130 each of which is mounted on a common shaft 132 (FIGURES 8, 9 and 10). Each star wheel 130 includes a pair of side-by-side annular grooves 134 and 136. The star wheels 130 are so positioned on the shaft 132 that the grooves 134 are positioned to receive and guide a line wire LW of the upper fabric and the grooves 136 are positioned to receive and guide a line wire LW' of the lower fabric. The star wheels 130 each have a plurality of circumferentially spaced radial slots 138 to permit the cross wires CW and CW' to pass through the star wheel. The star wheels 130 thus are adapted to maintain the upper and lower fabric in their relative lateral positions with respect to each other and with respect to the hinge forming mechanism 14. The star wheels 130 are mounted to the shaft 132 by set screws 139 which shaft in turn is freely rotatable upon movement of the fabric and thus will rotate as the fabric is moved by the fabric pulling mechanism 12. The upper and lower fabric passes through the star wheels 130 to the hinge forming mechanism 14.

*Hinge forming mechanism*

Referring now to FIGURES 10 through 14 the hinge forming mechanism 14 which is adapted to form each cross wire CW' of the lower fabric into a hook around the outermost line wire LW of the upper fabric is shown in detail.

The hook forming mechanism 14 has a base plate 140 mounted in a groove 141 of a support member 142. A housing member 143 is secured to the base plate 140. The base plate 140 in turn rests on a platform 140a to which a geared crank 141a is secured. The crank 141a meshes with a rack 142a provided on the base plate 140. Rotation of the crank will move the base plate longitudinally in the plane of travel of the fabric.

The housing member 143 is provided with a slot 144 through which the upper and lower fabric moves. Mounted within the housing member 143 is a circular gear 145 which is meshed with a rack 146. The gear 145 is provided with a roller 147 mounted eccentrically with respect to the axis of rotation of the gear 145 and hence movable orbitally about the axis of rotation of the gear 145, which axis lies on the plane of the slot 144. Therefore, upon rotation of the gear 145, the roller 147 will orbit about the slot 144. The housing member 143 has a recess 150 formed therein and the roller 147 is positioned to move in the recess 150 as it orbits.

The rack 146 is actuated by a hydraulic cylinder 148 which is mounted on the base plate 140 by support columns 149. The base plate 140 is movable in the groove 141 transversely of the path of travel of the fabric by means of a crank 151 mounted on the base plate 140 and threadably engaging a collar 152 welded to the support member 142. Rotation of the crank will move the base plate 140 in the groove 141 transversely on the plane of fabric travel to position the housing member 143 so that the roller 147 is in position to form the hinges as will be described.

A lower guide die 153 and an upper die 154 are bolted to the housing member 143 and define between them a passage 155 to receive and guide the lower fabric. The upper die 154 has a base portion 154a having a support groove 156 adapted to support the outermost line wire LW of the upper fabric. The upper die 154 also has a top portion 157 spaced from the base portion 155 and defining therebetween a passage 158 adapted to receive and guide the upper fabric. The leading edge of the base portion 155 of the upper die 154 is rounded as at 159 to deflect the cross wires CW' of the lower fabric downwardly into the lower passage 155. The lower part of the base portion 155 of the upper die 154 terminates on the entry side of the slot 144, but an extension 160 of the side part of base portion 155 extends into the slot 144. Groove 156a, which is an extension of the side wall of the groove 156 is formed on extension 160 and contacts the side of the outermost line wire LW of the upper fabric. Upper and lower fabric guides 161 and 162 are provided which are welded to the housing member 143.

The fabric is advanced through the star wheels 130 and into the slot 144 of the housing member 143. The outermost line wire LW of the upper fabric is supported by support grooves 156 and 156a and the upper fabric passes through passage 158. The lower fabric passes through passage 155. During the time when the fabric is being advanced, the gear 145 and roller 147 are in the position shown in solid lines in FIGURE 13. When the upper and lower fabrics have been advanced by the puller fingers 94 and 94', the cross wire CW' of the lower fabric is positioned in vertical alignment with the roller 147 and abuts against the lower edge of the outermost line wire LW of the upper fabric. The line wire LW is supported laterally by the groove 156a. With the line wire LW and cross wire CW' in this position the rack is actuated causing the gear 145 to rotate which causes the roller 147 to orbit about the slot 144. The roller will follow the path as shown in FIGURE 13 which will bend the cross wire CW' into a hook H about the outermost line wire LW of the upper fabric. The upper fabric is supported and restricted from upward movement by the cross wire CW of the upper fabric abutting against the top portion 157 of the upper die 154 and from downward and lateral movement by the grooves 156 and 156a abutting the outermost line wire LW.

When the hook has been formed the rack is reversed and the gear returns the roller to the position shown in full lines in FIGURE 13. When the roller has returned the fabric is advanced to the hinge closing mechanism 16 passing through a radial slot 163 formed in the gear 145.

*Hinge closing mechanism*

The hinge closing mechanism, as can best be seen in FIGURE 15, includes a frame member 180 mounted for movement longitudinally, with respect to the path of travel of the fabric, on a dovetail 182 which in turn is mounted to the support frame 128 by a support plate 184. The frame member 180 has mounted thereon an upper die 186 having a slanted or angled face 188. A vertical movable member 190 is mounted on the frame member 180 and has a die 192 mated with the die 186. The die member 190 is movable by a hydraulic cylinder 193. Vertical upward movement of the member 190 with the formed hook of the cross wire CW' positioned between the dies 186 and 192 will cause the hook to be clinched as shown in FIGURE 15, thus completing the hinge connection of the lower fabric and the upper fabric.

From the hinge closing mechanism 16 the fabric is advanced to a conventional shear 18 adapted to shear the line wires LW and LW' at selected intervals to provide sheets of hingedly interconnected fabric.

*Fabric*

Referring now to FIGURES 16 through 18 the fabric formed according to this invention is shown. FIGURE 16 shows the fabric hingedly interconnected and in an unfolded condition. FIGURE 17 which is a side elevational view shows in greater detail the hinged panels of fabric in the unfolded condition and FIGURE 18 is similar to FIGURE 17 but shows the fabric panel edges as they are produced by the machine.

*Synchronization*

The entire mechanism is synchronized to continuously produce hinged panels of fabric of the desired length. Both the welder 10 and fabric pulling mechanism 12 are driven from a common motor 200 through a gear reducer 202 and chain drive 204 in a well known manner. As has been indicated previously the fabric pulling mechanism 12 is coordinated with the welder 10 to draw the fabric from the welder after each cross wire CW and CW' has been welded to its respective line wires LW and LW'. The fabric is intermittently pulled by the puller fingers 94 and 94' during one-half of the cycle of eccentric 108 and maintained in this advanced condition by keepers 110 during the return portion of the cycle of the eccentric 108.

Figure 20:
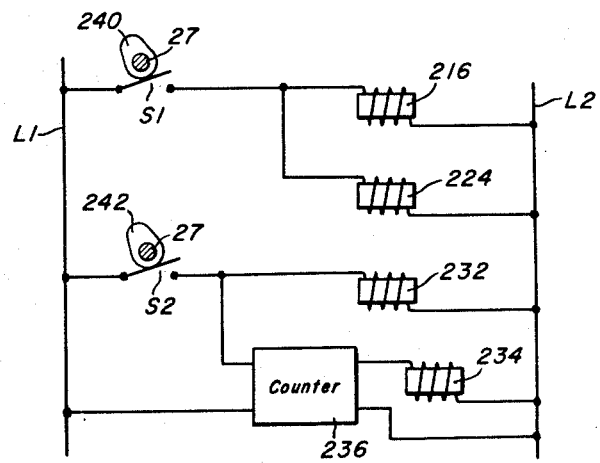
FIGURE 20 is a view of the electric control circuit.

The drive and timing devices for the hinge forming mechanism 14, hinge closing mechanism 16, and shears 18 and 122 are shown in FIGURES 19 and 20.

Referring now to FIGURE 19, the hydraulic cylinder 148 which drives the rack 146 of the hinge forming mechanism 14 is connected to a conventional four-way solenoid valve 210. The valve 210 is arranged to admit fluid alternately to opposite ends of the cylinder 148 to drive piston 212 of the cylinder reciprocally. The valve 210 includes a spring 214 which normally maintains the valve in a position to supply fluid to the left side of the cylinder 148 which will drive the rack to the right as seen in FIGURE 10. A solenoid coil 216 is provided which when energized moves the valve 210 to admit hydraulic fluid to the right side of the cylinder 148 to drive the rack toward the left as seen in FIGURE 10. When the rack is driven to the left it will rotate the gear 145 to form the hinge as has been previously described. When the coil 216 is de-energized, the spring 214 will move the valve to admit fluid to the left side of the cylinder to return the piston to the right.

The hydraulic cylinder 193 of the hinge closing mechanism 16 is also operated by a conventional four-way solenoid valve 220. The valve 220 is provided with a spring 222 which normally positions the valve 220 to admit fluid to the top of the cylinder 193 which will urge the movable member 190 downwardly. The valve 220 has a solenoid coil 224 which when energized will shift the valve to admit fluid to the bottom cylinder 193 which will drive the member 190 upwardly to clinch the formed hinges.

Referring now to FIGURE 20, the electrical circuit for the timing mechanism is shown. The circuit includes a pair of line wires L1 and L2 to supply the necessary electric power. The solenoid coil 216 of valve 210 is connected between the lines L1 and L2 through cam switch S1. The solenoid coil 224 of the valve 220 is also connected between the line wires L1 and L2 through solenoid switch S1 in parallel with coil 216. Actuation solenoid 232, which is adapted to actuate the edge trimming shears 122, is connected between the line wires L1 and L2 through cam switch S2. An actuation solenoid 234, which is adapted to actuate cut-off shear 18, is connected between line wire L2 and a wire counter 236, the counter having one lead connected directly to line wire L1 and a second lead connected through switch S2 to line wire L1. The counter 236 is adapted to count the number of line wires to determine the length of the fabric and, after a predetermined length of fabric has been made, to actuate cut-off shear 18 to cut the fabric at this length. A suitable counter is Micro Flex Counter, described in Bulletin No. 720, Catalog #H240A6, manufactured by Eagle Signal Company.

The cam switches S1 and S2 are operable by cams 240 and 242 which are mounted on shaft 27 and arranged to synchronize the operation of the hinge forming mechanism 14, the hinge closing mechanism 16, and the shears 18 and 122 with the other operations. The switches S1 and S2 are normally in the open position and thus the shears 18 and 122 are non-operating and the solenoid coils 216 and 224 are non-energized. The cams 240 and 242 are adjusted so that as soon as the fabric has been advanced by the fabric pulling mechanism 12, and the puller fingers 94 and 94' are starting their return movement the cams 240 and 242 will close switches S1 and S2. When switch S1 is closed the solenoid coils 216 and 224 are energized which will shift valves 210 and 220 to actuate the hydraulic cylinders 148 and 193. Actuation of the cylinders will cause the rack 146 to move to the left as seen in FIGURE 10 and form a hinge, and cause members 190 to move upwardly to clinch the previously formed hinge between dies 186 and 192. When switch S2 is closed solenoid 232 is energized to actuate the shear 122 to trim the ends of the line wires LW and LW'. Also, when switch S2 is closed the counter 236 is energized and if the counter has counted the selected length of fabric it will actuate shear 18 to cut the line wires LW and LW' to cut the fabric to length.

The cams 240 and 242 are arranged so that the switches S1 and S2 will be opened before the puller fingers 94 and 94' have returned. As soon as switch S1 is opened solenoid coils 216 and 224 will be de-energized, and the springs of each valve 210 and 220 will return the valves so that the cylinders will be actuated to return to the normal positions described above and ready for the next operation. Similarly, solenoid 234 is de-energized when switch S2 is opened and operation of the shear is halted, and also solenoid 234 is de-energized stopping the operation of the shear 122.

*Adjustment*

Each of the elements of the device is made adjustable to accommodate different spacings of the line wires LW and LW' and different spacings of cross wires CW and CW'. With respect to the spacing of the line wires LW and LW' the gun assemblies 30 are slidably engaged on the dovetail plate 28 for movement laterally across the welder 10 and each stationary electrode 50 is slidably maintained in the dovetail groove 58 and movable therein to match the gun assembly 30. In a similar way, the gun assemblies 30' and electrodes 60' are movable. Hence, the lateral spacing of the line wires in the welder can be selected. The puller fingers 94 are maintained in a dovetail groove and are movable therein so that they may be positioned between the line wires LW at whatever spacing is chosen. The puller fingers 94' are similarly maintained and movable. Also, the keepers 110 and 110' are maintained in dovetail grooves which allow them to be moved laterally for positioning with the line wires LW and LW' so that they may contact and hold the cross wires CW and CW'. The star wheels 130 are positionable on the shaft 132 to allow the grooves 134 and 136 to receive the line wires LW and LW'. The frame 140 of the hinge forming device is movable by means of the crank 151 so that it is positioned properly with respect to the outer line wire LW and the cross wire CW' to properly form the cross wire CW' into a hook around the outer line wire LW.

To achieve different spacing of the cross wires CW and CW' the throw of the eccentric 108 is adjustable so that the fabric will be pulled through the welder the exact distance required between the cross wires. The welder will then automatically go through its cycle as described above welding the cross wires to the line wires with the fabric having been advanced the required distance from the next preceding cross wire. In order to accommodate for these different spacings between these cross wires and the keepers 110 are movable with the eccentric 108 when the eccentric is adjusted for the pulling of the fabric. In order to provide the proper spacing between the hinge forming device 14 and the hinge closing device 16 the hinge closing device 16 is maintained for movement longitudinally on the path of the fabric on a dovetail plate 132. Thus, the hinge closing mechanism 16 can be maintained a proper distance from the hinge forming mechanism 14 to properly clinch the hinges as they are moved successively to the hinge closing mechanism from the hinge forming mechanism. Adjustment of the hinge forming mechanism longitudinally along the path of travel of the fabric is accomplished by turning the crank 141a which will position the base plate 140 longitudinally.

While one embodiment of my invention has been shown and described it will be apparent that other adaptations and modifications may be made without departing from the scope of the following claims.

I claim:

1. Apparatus for forming hinged wire fabric comprising, a welder having an upper and a lower set of electrodes each set being adapted to weld cross wires to line wires to form welded wire fabric, means to deliver a set of upper line wires to the upper set of electrodes and a set of lower line wires to the lower set of electrodes, means to feed upper cross wire to the upper set of electrodes in position for welding to the upper line wires and means to feed lower cross wire to the lower set of electrodes in position for welding to the lower line wires, means to actuate said electrodes for welding to thereby form an upper wire fabric strip and a lower wire fabric strip in superposed relationship, said upper and lower sets of electrodes being offset to position cross wires for forming into hinges, means to advance said upper and lower fabric strips from said welder, and means to hingedly interconnect said upper and lower fabric strips while in superposed relationship.

2. The combination of claim 1 wherein the upper and lower sets of electrodes are offset to position line wires for nesting.

3. Apparatus for forming hinged wire fabric comprising, a welder having an upper and a lower set of electrodes each set being adapted to weld cross wires to line wires to form welded wire fabric, said upper set of electrodes including a plurality of in-line movable electrodes and a like number of aligned stationary electrodes, said lower set of electrodes including a plurality of in-line movable electrodes and a like number of aligned stationary electrodes, means to deliver a set of upper line wires to the upper set of electrodes and a set of lower line wires to the lower set of electrodes, means to feed upper cross wire to the upper set of electrodes in position for welding to the upper line wires and means to feed lower cross wire to the lower set of electrodes in position for welding to the lower line wires, means to move said movable electrodes toward and away from said stationary electrodes for welding the cross wires to the line wires to thereby form an upper fabric strip and a lower fabric strip in superposed relationship, said upper and lower sets of electrodes being offset longitudinally with respect to the direction of travel of the fabric whereby the cross wires of the upper and lower fabric will be offset for forming into hinges, means to advance said upper and lower fabric strips from said welder, and means to hingedly interconnect said upper and lower fabric strips while in superposed relationship.

4. The combination of claim 3 wherein the upper and lower sets of electrodes are offset laterally with respect to the direction of travel of the fabric whereby the line wires of the upper and lower fabrics are offset for nesting.

5. Apparatus for forming hinged wire fabric comprising, a welder having an upper and a lower set of electrodes each set being adapted to weld cross wires to line wires to form welded wire fabric, said upper set of electrodes including a plurality of in-line movable electrodes and a like number of aligned stationary electrodes, said lower set of electrodes including a plurality of in-line movable electrodes and a like number of aligned stationary electrodes, means to deliver a set of upper line wires to the upper set of electrodes and a set of lower line wires to the lower set of electrodes, means to feed upper cross wire to the upper set of electrodes in position for welding to the upper line wires and to feed lower cross wire to the lower set of electrodes in position for welding to the lower line wires, said last named means including releasable clamp means adapted to position and releasably hold the cross wires in position for welding, said clamp means having a closed clamping position wherein the cross wires are firmly held, and an open position wherein the cross wires are released, and resilient means normally biasing the clamp means into their closed positions, means to move said movable electrodes toward and away from said stationary electrodes for welding the cross wires to the line wires to thereby form an upper fabric strip and a lower fabric strip in superposed relationship, means to advance said upper and lower fabric strips from said welder, and means to hingedly interconnect said upper and lower fabric strips while in superposed relationship.

6. The combination of claim 5 wherein said clamp means are pivoted levers normally urged to a closed position by spring means, said levers having matching grooves adapted to receive and hold a cross wire while in the closed position.

7. Apparatus for forming hinged wire fabric comprising, a welder having an upper and a lower set of electrodes each set being adapted to weld cross wires to line wires to form welded wire fabric, means to deliver a set of upper line wires to the upper set of electrodes and a set of lower line wires to the lower set of electrodes, means to feed upper cross wire to the upper set of electrodes in position for welding to the upper line wires and means to feed lower cross wire to the lower set of electrodes in position for welding to the lower line wires, means to actuate said electrodes for welding to thereby form an upper wire fabric strip and a lower wire fabric strip in superposed relationship, means to advance said upper and lower fabric strips from said welder, and hinge forming means adapted to hingedly connect the cross wires of one of the fabric strips to one of the line wires of the other fabric strip while the strips are superposed.

8. The combination of claim 7 wherein said hinge forming means includes a bending wheel movable orbitally and positioned to bend the ends of the cross wires of one of said fabric strips around the outermost line wire of the other of said fabric strips, and clinching means positioned to clinch the bent cross wires thereby forming the hinged interconnection.

9. The combination of claim 7 further characterized by means interposed between the welder and the hinge forming means to maintain a predetermined lateral relationship between the upper and lower strips of fabric as they enter the hinge forming means.

10. The combination of claim 7 characterized by a star wheel adjacent the entry side of the hinge forming means, said star wheel having a pair of circumferential grooves, one of said grooves adapted to support one line wire of the lower fabric strip and the other groove adapted to support a line wire of the upper fabric, whereby the upper and lower fabric strips are laterally aligned as they enter the hinge forming means.

11. A method of forming hinged wire fabric comprising the steps of, simultaneously forming a pair of superposed welded wire fabric strips having line wires and cross wires, maintaining said superposed strips with their line wires and cross wires offset, and hingedly connecting one end of the cross wires of one of said fabric strips to one of the outer line wires of the other fabric strips while they are so maintained.

12. The method of claim 11 wherein the upper and lower fabric strips are formed with their line wires and cross wires offset.

13. The method of claim 11 wherein the hinged connection is formed by first bending the cross wires of said one wire fabric around the said line wire of said other wire fabric by an orbiting roller, and thereafter clinching said bent wire to form a hinged connection.

References Cited by the Examiner
UNITED STATES PATENTS

| | | | |
|---|---|---|---|
| 1,448,566 | 3/23 | Muller et al. | 219—56 |
| 2,349,496 | 5/44 | Gillum et al. | 219—56 |
| 2,422,829 | 6/47 | Fotie | 219—56 |

RICHARD M. WOOD, *Primary Examiner.*

UNITED STATES PATENT OFFICE
CERTIFICATE OF CORRECTION

Patent No. 3,194,935                                      July 13, 1965

Albert L. Stoeckel

It is hereby certified that error appears in the above numbered patent requiring correction and that the said Letters Patent should read as corrected below.

Column 1, line 24, for "side" read -- site --; column 2, line 5, for "15" read -- 14 --; column 4, line 40, for "wlder" read -- welder --; line 45, for "uper" read -- upper --; column 9, line 29, strike out "and".

Signed and sealed this 21st day of December 1965.

(SEAL)
Attest:

ERNEST W. SWIDER                                          EDWARD J. BRENNER
Attesting Officer                                            Commissioner of Patents